June 26, 1962 R. E. FOUNTAIN 3,041,231
METHOD OF MAKING LAMINATED BOARDS FROM ROTTEN GRADE WOOD
Filed June 11, 1959
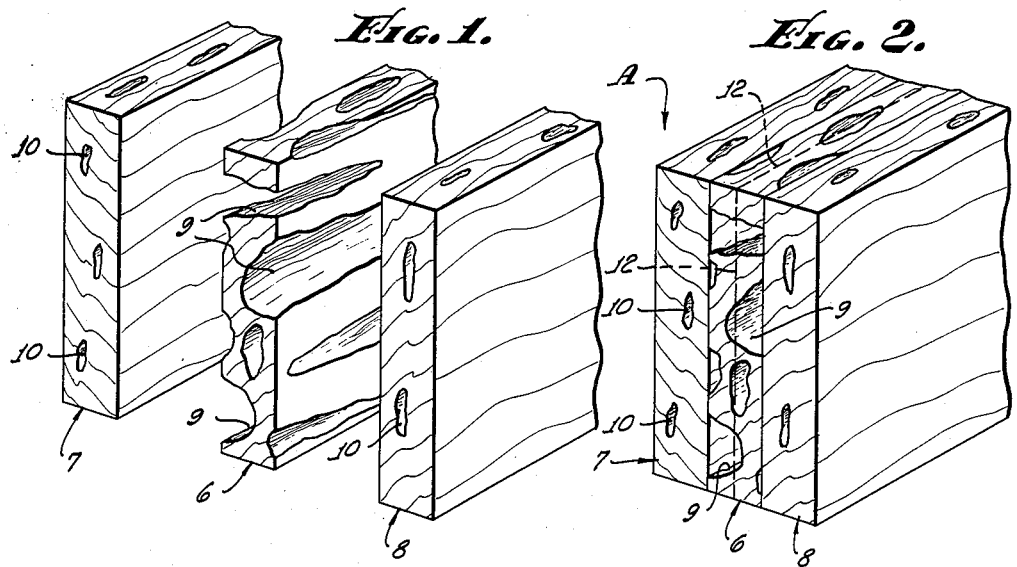
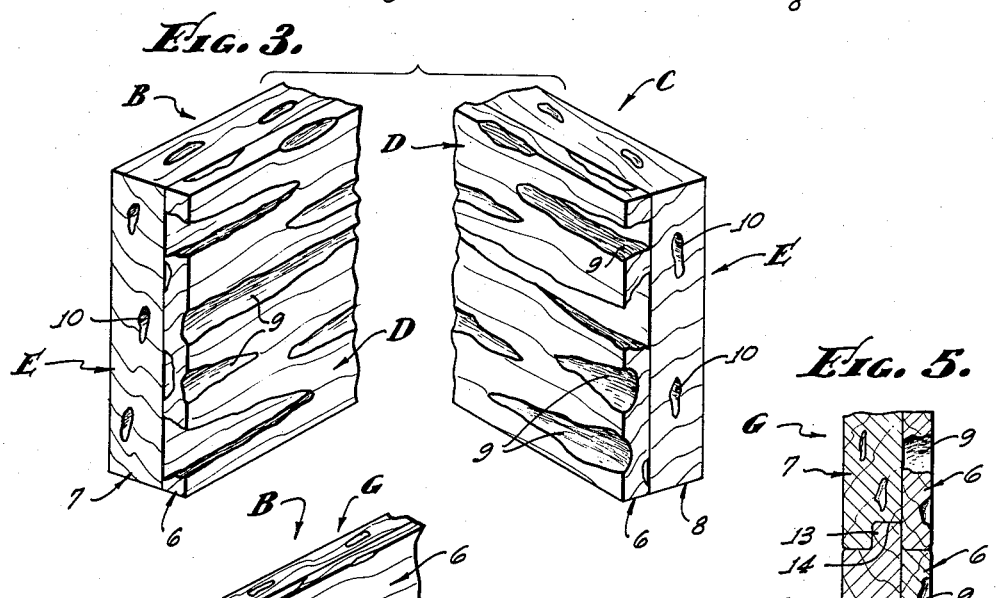
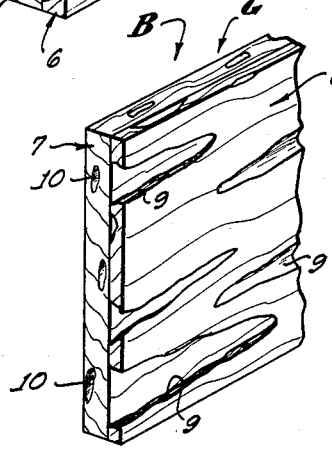
INVENTOR.
REX E. FOUNTAIN
BY
Paul A. Weilein
ATTORNEY

3,041,231
METHOD OF MAKING LAMINATED BOARDS FROM ROTTEN GRADE WOOD
Rex E. Fountain, Pasadena, Calif., assignor to Ed Fountain Lumber Co., Los Angeles, Calif., a partnership
Filed June 11, 1959, Ser. No. 819,665
1 Claim. (Cl. 156—254)

This invention relates to laminated wood paneling and to a novel method of making the same.

In the production of lumber from logs having rotted portions, particularly certain species of cedar, some of the boards cut therefrom have rot holes and cavities or depressions formed therein to such extent that, heretofore, these boards have been considered unfit for practical use.

Rotted boards such as described, particularly where the rot holes and depressions cover the major portion of the boards, cannot be cut to thicknesses suitable for paneling without being weakened to such extent as would make such use impracticable. Even when such boards are cut in thicknesses of one inch or better, they do not, in many instances, have a strength making them useful for any structural purpose and, therefore, have been considered as waste material.

It is an object of the present invention to provide a novel and inexpensive method of making useful and decorative wood paneling of desired thickness with this waste material.

It is another object of the present invention to provide a method such as described by means of which a decorative wood panel board may be produced in a form having sufficient strength to be used in paneling walls, partitions and the like, as well as for other structural purposes, wherein the board is characterized by a marked random pattern of rot holes and depressions of a highly decorative appearance.

Other objects and advantages of the invention will be hereinafter described or will become apparent to those skilled in the art, and the novel features of the invention will be defined in the appended claim.

Referring to the drawings:

FIG. 1 is a fragmentary perspective view of three boards such as employed in carrying out the method hereof as they would appear before being assembled one upon the other;

FIG. 2 is a fragmentary perspective view of the three boards as they would appear after being subjected to pressure to bond them together as a laminated unit;

FIG. 3 is a fragmentary perspective view of two panel boards as formed by dividing the unit as along the dotted line shown in FIG. 2;

FIG. 4 is a fragmentary perspective view of one of the panel boards as it would appear after being trimmed to a predetermined size; and FIG. 5 is a fragmentary sectional view on an enlarged scale showing how the panel boards made in accordance with this method may be formed with tongues and grooves for interfitting thereof.

In carrying out this invention, a careful selection is made from a stock of boards of rotten grade lumber such as cedar, the boards being for example, one inch thick, eight to twelve inches wide, and eight or more feet in length, or of other dimensions such as are available. The selection is made to provide three boards having differing characteristics suitable for making a laminated unit from which a pair of finished panel boards may be produced in accordance with the method.

Three typical selected boards designated 6, 7 and 8 are shown in the accompanying drawing wherein the board 6 has formed therein substantially throughout the area thereof on both faces, a number of holes and elongated depressions 9 formed by rot, some of which may extend through the board.

It is important that the boards 7 and 8 have no through holes therein and less rotten portions 10 than the board 6, also that they be carefully selected as to the location and extent of the rotten portions so as to avoid the likelihood of the formation of through holes in the finished boards produced as hereinafter described by the method hereof.

After the boards 6, 7 and 8 have been selected, an adhesive is applied to faces thereof and the three boards are assembled in face to face relation one upon the other with the board 6 between the boards 7 and 8 and in such a manner as to avoid positioning opposite any through hole in the board 6, a rotted portion 10 of the boards 7 and 8 which rotten portion, if the boards 7 and 8 are reduced in thickness by planing, would cause a through hole to be formed in the finished boards produced by this method. After being assembled in this manner, the three boards are subjected to such pressure as required to bond them together and thus form the laminated unit A shown in FIG. 2.

After the adhesive has been allowed to set, the unit A is divided by cutting through the center board 6, for example as indicated by the dashed line 12 in FIG. 2, thereby producing two laminated panel boards B and C, as shown in FIG. 3, wherein each board is characterized by a veneer or face board D which is a section of the board 6, and a backing board E which is one or the other of the boards 7 and 8. In cutting the board 6 in half, the cut is made through many of the rot holes and portions 9 so that portions of the holes and formations 9 are displayed in a decorative pattern, with solid portions of the backing board E exposed at the holes 9 of this pattern. Formed in this manner the panel boards B and C are imperforate and have requisite body and strength for structural uses.

The boards B and C, as shown in FIG. 3, may have the exposed faces thereof planed off as desired, for example to the extent indicated in FIG. 4, thereby forming a typical panel board G of the desired thickness for use as a wall covering or paneling of any kind.

Should it happen that finished panel boards G made in accordance with this method have one or more through holes in portions adjacent edges or ends thereof, these portions, in many instances, may be trimmed off and this will leave usable panel boards of different widths or lengths that are still subject to use in forming decorative panels.

As shown in FIG. 5, the longitudinal edges of the panel boards G may be formed with tongues 13 and grooves 14 to facilitate the interfitting of the boards in forming panels and the like.

The boards formed in accordance with this invention of rotten grade cedar, will have fungus formations and fragile rotten portions in and around the holes and depressions 9 and if desired, these fungus formations and rotten portions may be allowed to remain in place for decorative purposes. If, on the other hand, it is desired to remove such portions, the boards are sand blasted to effect such removal. Moreover, this sand blasting may be effected to cut away parts of the rotten portions 9, also cut away the solid portions of the backing exposed in the holes 9, thereby providing the panel boards with a uniform graining and color appearance to enhance the decorative effect.

It will now be apparent that in accordance with this method, rotten grade boards heretofore considered a waste product are utilized in a novel manner to produce a decorative panel board of requisite strength, body and attractive appearance for exterior and interior paneling and wall covering.

While specific structural details have been shown and described, it should be understood that changes and alterations may be resorted to without departing from the spirit of the invention as defined in the appended claim.

I claim:

A method of making laminated boards from rotten grade wood, which includes the steps of: selecting from a stock of boards of said rotten grade wood, three boards of substantially the same thickness, one of which is characterized by having a substantial number of rot holes and depressions formed by rot; applying an adhesive to faces of said boards; assembling said boards one upon the other with said one board between the others and with the said faces abutting; applying pressure to the assembled boards to bond them together as a laminated structure; and then dividing said structure by cutting through said center board so that rot holes and depressions therein will be exposed in a random pattern on the outer faces of the divided portions of the center board bonded to said other boards, and sand blasting the cut faces of said center board to remove all rot from said holes and depressions to expose surface portions of said other boards therethrough and to texture said cut faces and the exposed portions of the surface of said other boards.

References Cited in the file of this patent

UNITED STATES PATENTS

| | | |
|---|---|---|
| 1,588,056 | Rockwell | June 8, 1926 |
| 1,893,430 | McKenzie | Jan. 3, 1933 |
| 2,569,831 | Ryall | Oct. 2, 1951 |

FOREIGN PATENTS

| | | |
|---|---|---|
| 1,129,696 | France | Sept. 10, 1956 |

OTHER REFERENCES

"High-Grade Siding Now Made From Common-Grade Boards," Oregon Forest Products Laboratory, Laboratory Notes, Corvallis, Oregon, No. 25, April 1957, 2 pages.